United States Patent [19]

Takimoto et al.

[11] Patent Number: 5,125,968
[45] Date of Patent: Jun. 30, 1992

[54] RECORDING LIQUID FOR INK JET RECORDING

[75] Inventors: Hiroshi Takimoto, Yokohama; Akira Kajikawa; Tomio Yoneyama, both of Kawasaki, all of Japan

[73] Assignee: Mitsubishi Kasei Corporation, Tokyo, Japan

[21] Appl. No.: 672,554

[22] Filed: Mar. 20, 1991

[30] Foreign Application Priority Data

| Mar. 20, 1990 [JP] Japan | 2-70089 |
| Apr. 3, 1990 [JP] Japan | 2-88593 |
| Apr. 24, 1990 [JP] Japan | 2-108293 |
| Apr. 24, 1990 [JP] Japan | 2-108294 |
| May 11, 1990 [JP] Japan | 2-122501 |
| Jun. 6, 1990 [JP] Japan | 2-147704 |

[51] Int. Cl.$^5$ .............................. C09D 11/02
[52] U.S. Cl. ........................................ 106/20
[58] Field of Search .............. 106/20, 22, 497; 8/529

[56] References Cited

U.S. PATENT DOCUMENTS

| 4,427,810 | 1/1984 | Chisvette et al. | 106/20 |
| 4,627,875 | 12/1986 | Kobayashi et al. | 106/22 |
| 4,923,515 | 5/1990 | Koike et al. | 106/20 |

FOREIGN PATENT DOCUMENTS

0194355 6/1987 European Pat. Off. .

OTHER PUBLICATIONS

Allen, III et al Reg #H564, Pub. Jan. 3, 1989, Pigment Milling Process.

*Primary Examiner*—Karl Group
*Assistant Examiner*—Helene Klemanski
*Attorney, Agent, or Firm*—Oblon, Spivak, McClelland, Maier & Neustadt

[57] ABSTRACT

A recording liquid for ink jet recording, which comprises an aqueous medium, a pigment and, as a dispersant, at least one member selected from the group consisting of compounds of the following formula (I) to (X):

$$R^1-CH_2CH(OH)(CH_2)_m SO_3M \quad (I)$$

wherein $R^1$ is a $C_{8-20}$ alkyl group, m is an integer of from 1 to 3, and M is Na or $NH_4$, $$R^2-CH=CH(CH_2)_n SO_3M \quad (II)$$

wherein $R^2$ is a $C_{8-20}$ alkyl group, n is an integer of from 1 to 3, and M is Na or $NH_4$,

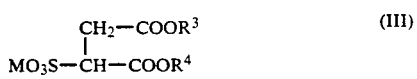

wherein each of $R^3$ and $R^4$ is a $C_{6-16}$ alkyl or alkenyl group, and M is Na or $NH_4$,

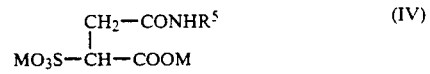

wherein $R^5$ is a $C_{10-20}$ alkyl or alkenyl group, and M is Na or $NH_4$,

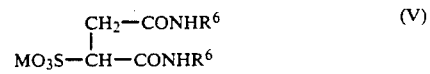

wherein $R^6$ is a $C_{6-16}$ alkyl or alkenyl group, and M is Na or $NH_4$,

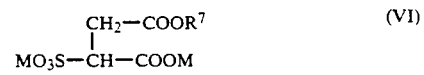

wherein $R^7$ is a $C_{10-20}$ alkyl or alkenyl group, and M is Na or $NH_4$,

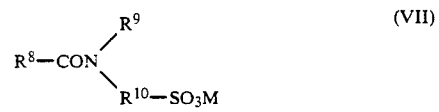

wherein $R^8$ is a $C_{10-20}$ alkyl or alkenyl group, $R^9$ is a $C_{1-4}$ alkyl group and $R^{10}$ is a $C_{1-3}$ alkylene group, and M is Na or $NH_4$,

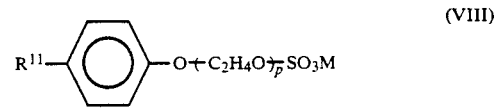

wherein $R^{11}$ is a $C_{6-18}$ alkyl group, p is an integer of from 1 to 15, and M is Na or $NH_4$,

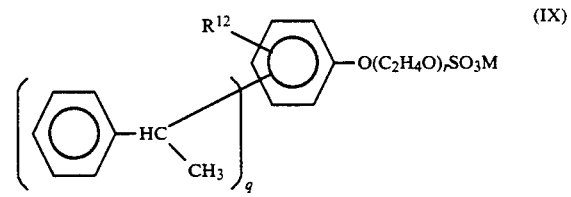

wherein $R^{12}$ is a methyl group or a hydrogen atom, q is an integer of 1 or 2, r is an integer of from 1 to 8, and M is Na or $NH_4$, and

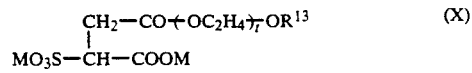

wherein t is an integer of from 1 to 10, $R^{13}$ is a $C_{10-20}$ alkyl or alkenyl group, and M is Na or $NH_4$.

18 Claims, No Drawings

RECORDING LIQUID FOR INK JET RECORDING

The present invention relates to a recording liquid suitable for ink jet recording, wherein a pigment is employed.

The ink jet recording system has rapidly been popular in recent years by virtue of such features that noise is less, the running cost is low, and color recording is easy. As coloring agents for recording liquids to be employed for ink jet recording, it is common to employ water-soluble dyes such as acid dyes and direct dyes. However, none of them is adequate from the viewpoint of fastness such as light resistance or water resistance. Their improvements are being studied, but none of them is fully satisfactory yet.

On the other hand, methods of using pigments as coloring agents have been studied since long ago. A number of patent applications have been made including Japanese Unexamined Patent Publications No. 12104/1982, No. 147859/1981, No. 147863/1981, No. 147869/1981, No. 157468/1981, No. 21466/1982 and No. 74973/1987.

When pigments are employed as coloring agents, the light resistance and water resistance would remarkably be improved over the dyes. However, the recording liquid tends to be poor in the storage stability and, for this reason, has not yet been practically employed.

It is an object of the present invention to provide a recording liquid for ink jet recording, which presents a recorded image having high light resistance and water resistance and which is excellent in the storage stability and jetting stability as a recording liquid.

The present invention provides a recording liquid for ink jet recording, which comprises an aqueous medium, a pigment and, as a dispersant, at least one member selected from the group consisting of compounds of the following formula (I) to (X):

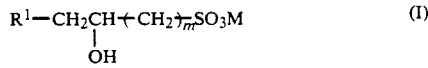

wherein $R^1$ is a $C_{8-20}$ alkyl group, m is an integer of from 1 to 3, and M is Na or $NH_4$,

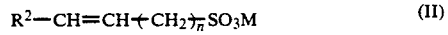

wherein $R^2$ is a $C_{8-20}$ alkyl group, n is an integer of from 1 to 3, and M is Na or $NH_4$,

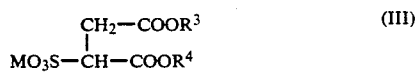

wherein each of $R^3$ and $R^4$ is a $C_{6-16}$ alkyl or alkenyl group, and M is Na or $NH_4$,

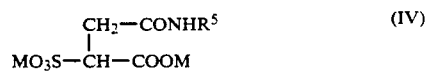

wherein $R^5$ is a $C_{10-20}$ alkyl or alkenyl group, and M is Na or $NH_4$,

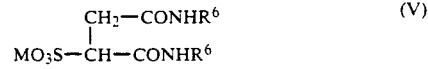

wherein $R^6$ is a $C_{6-16}$ alkyl or alkenyl group, and M is Na or $NH_4$,

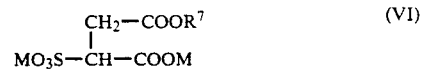

wherein $R^7$ is a $C_{10-20}$ alkyl or alkenyl group, and M is Na or $NH_4$,

wherein $R^8$ is a $C_{10-20}$ alkyl or alkenyl group, $R^9$ is a $C_{1-4}$ alkyl group and $R^{10}$ is a $C_{1-3}$ alkylene group, and M is Na or $NH_4$,

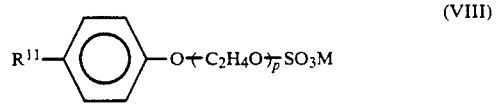

wherein $R^{11}$ is a $C_{6-18}$ alkyl group, p is an integer of from 1 to 15, and M is Na or $NH_4$,

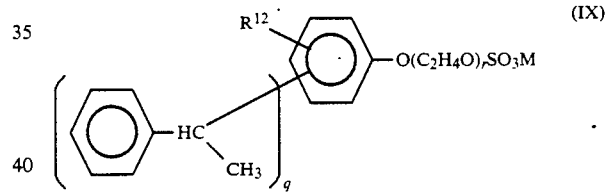

wherein $R^{12}$ is a methyl group or a hydrogen atom, q is an integer of 1 or 2, r is an integer of from 1 to 8, and M is Na or $NH_4$, and

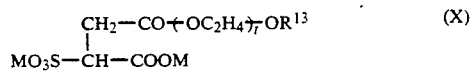

wherein t is an integer of from 1 to 10, $R^{13}$ is a $C_{10-20}$ alkyl or alkenyl group, and M is Na or $NH_4$.

In the above formulas (I) to (X), the alkyl group and/or the alkenyl group for $R^1$ to $R^{11}$ and $R^{13}$, may be straight-chained or branched so long as their carbon numbers are within the respective ranges. In the case of the alkenyl group, the position of the double bond is not particularly limited. The alkylene group for $R^{10}$ may also be straight-chained or branched.

The dispersants of the formulas (I) to (X) according to the present invention, may be used alone or in combination as a mixture of at least two members of different formulas or at least two members of the same formula having different substitutes. In a case where a process produces a mixture of at least two members, such a mixture may usually be used as it is.

Thus, the dispersant is selected practically from the group consisting of (a) at least one member selected from the group consisting of compounds of the formulas (I) and (II), (b) at least one member selected from the group consisting of compounds of the formulas (III) to (VI), (c) at least one member selected from the group consisting of compounds of the formula (VII), (d) at least one member selected from the group consisting of compounds of the formula (VIII), (e) at least one member selected from the group consisting of compounds of the formula (IX) and (f) at least one member selected from the group consisting of compounds of the formula (X).

The following compounds may be mentioned as specific examples of the dispersants of the formula (I) to (X).

(1) Specific examples of the dispersants of the formulas (I) and (II):

$C_{12}H_{25}CH_2CH(OH)-CH_2-SO_3Na$  No. 1-1

$C_{12}H_{25}CH_2CH(OH)-CH_2-CH_2-SO_3NH_4$  No. 1-2

$C_8H_{17}CH_2CHCH_2CH_2CH_2SO_3Na$ (OH)  No. 1-3

$C_{18}H_{37}-CH_2CHCH_2SO_3Na$ (OH)  No. 1-4

$C_{11}H_{23}-CH=CH-CH_2-SO_3Na$  No. 1-5

$C_{14}H_{29}-CH=CH-CH_2CH_2-SO_3NH_4$  No. 1-6

$C_{12}H_{25}-CH=CH-CH_2SO_3Na$  No. 1-7

As such compounds, Liporan PB-800 (tradename, manufactured by Lion Corporation, Liporan LB-840 (tradename, manufactured by Lion Corporation) and Liporan PJ-400 (tradename, manufactured by Lion Corporation) are, for example, commercially available, and they may be suitably employed.

(2) Specific examples of the dispersants of the formulas (III) to (VI):

$\begin{array}{l} CH_2COOC_8H_{17} \\ | \\ NaO_3SCHCOOC_8H_{17} \end{array}$  No. 2-1

$\begin{array}{l} CH_2COOC_{11}H_{21} \\ | \\ NaO_3S-CHCOOC_{11}H_{21} \end{array}$  No. 2-2

$\begin{array}{l} CH_2COOC_9H_{17} \\ | \\ H_4NO_3S-CHCOOC_9H_{17} \end{array}$  No. 2-3

$\begin{array}{l} CH_2COOC_{11}H_{21} \\ | \\ NaO_3S-CHCOOC_6H_{13} \end{array}$  No. 2-4

$\begin{array}{l} CH_2-CONHC_{18}H_{37} \\ | \\ NaO_3S-CH-COONa \end{array}$  No. 2-5

$\begin{array}{l} CH_2-CONHC_{12}H_{25} \\ | \\ NaO_3S-CH-COONa \end{array}$  No. 2-6

$\begin{array}{l} CH-CONHC_{17}H_{35} \\ | \\ NH_4O_3S-CH-COONH_4 \end{array}$  No. 2-7

$\begin{array}{l} CH-CONHC_8H_{17} \\ | \\ NaO_3S-CH-CONHC_8H_{17} \end{array}$  No. 2-8

$\begin{array}{l} CH-CONHC_{12}H_{25} \\ | \\ NaO_3S-CH-CONHC_{12}H_{25} \end{array}$  No. 2-9

$\begin{array}{l} CH-CONHC_6H_{13} \\ | \\ NH_4O_3S-CH-CONHC_6H_{13} \end{array}$  No. 2-10

$\begin{array}{l} CH_2-COOC_{18}H_{37} \\ | \\ NaO_3S-CH-COONa \end{array}$  No. 2-11

$\begin{array}{l} CH_2-COOC_{12}H_{25} \\ | \\ NaO_3S-CH-COONa \end{array}$  No. 2-12

$\begin{array}{l} CH_2-COOC_{17}H_{35} \\ | \\ NH_4O_3S-CH-COONH_4 \end{array}$  No. 2-13

$\begin{array}{l} CH_2-CONHC_{18}H_{35} \\ | \\ NH_4O_3S-CH-COONa \end{array}$  No. 2-14

$\begin{array}{l} CH_2-CONH-C_{11}H_{21} \\ | \\ NH_4O_3S-CH-COONa \end{array}$  No. 2-15

$\begin{array}{l} CH_2-CONHC_{18}H_{35} \\ | \\ NH_4O_3S-CH-CONHC_{18}H_{35} \end{array}$  No. 2-16

$\begin{array}{l} CH_2-COOC_{18}H_{35} \\ | \\ NH_4O_3S-CH-COONH_4 \end{array}$  No. 2-17

As such compounds, Rapizol B-80 (manufactured by Nippon Oil and Fats Co., Ltd.), Diaserver PN-1970J (manufactured by Hoechst), Ripal NTD (manufactured by Lion Corporation) and Ripal NCD (manufactured by Lion Corporation) are commercially available, and they may be suitably employed.

(3) Specific examples of the dispersant of the formula (VII):

$C_{18}H_{37(n)}CON\begin{array}{l} CH_3 \\ C_2H_4SO_3Na \end{array}$  No. 3-1

$C_{11}H_{23(n)}CON\begin{array}{l} C_2H_5 \\ C_2H_4SO_3Na \end{array}$  No. 3-2

$C_{17}H_{33}CON\begin{array}{l} CH_3 \\ C_2H_4SO_3Na \end{array}$  No. 3-3

$C_{17}H_{35(n)}CON\begin{array}{l} CH_3 \\ C_2H_4SO_3Na \end{array}$  No. 3-4

As such compounds, Diaserver SC-T (tradename, manufactured by Hoechst), Diapon T (tradename, manufactured by Nippon Oil and Fats Co., Ltd.), Diapon LM (tradename, manufactured by Nippon Oil and Fats Co., Ltd.) and Ripotac TE (tradename, manufactured by Lion Corporation) are commercially available, and they may be suitably employed.

(4) Specific examples of the dispersant of the formula (VIII):

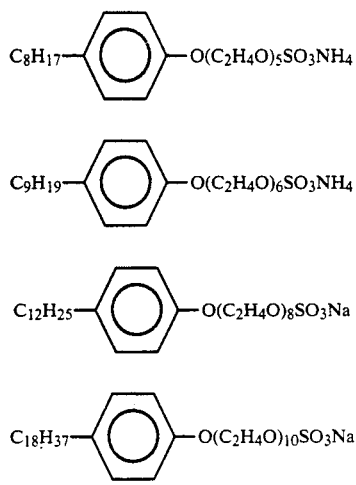

No. 4-1

No. 4-2

No. 4-3

No. 4-4

As such compounds, Newcol 560SF (tradename, manufactured by Nippon Nyukazai K.K.) and Sannol NP-1930 (tradename, manufactured by Lion Corporation) are commercially available, and [hey may suitably be employed.

(5) Specific examples of the dispersant of the formula (IX):

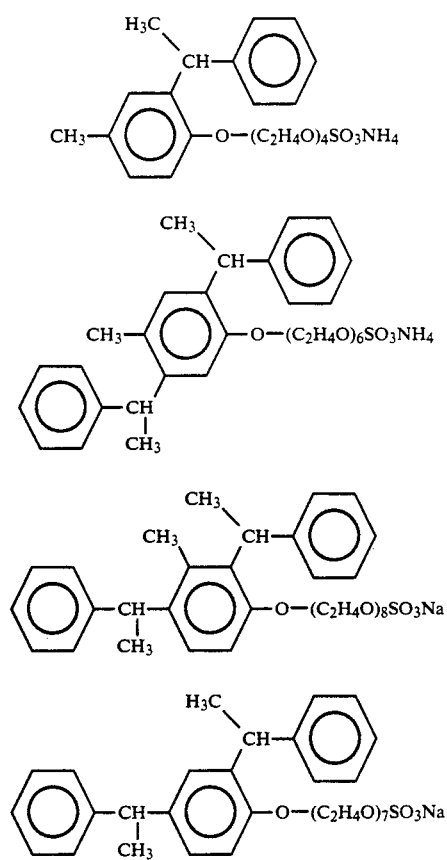

No. 5-1

No. 5-2

No. 5-3

No. 5-4

As such compound, Newcol 707SF (tradename, Nippon Nyukazai K.K.) is commercially available, and this can suitably be employed.

(6) Specific examples of the dispersant of the formula (X):

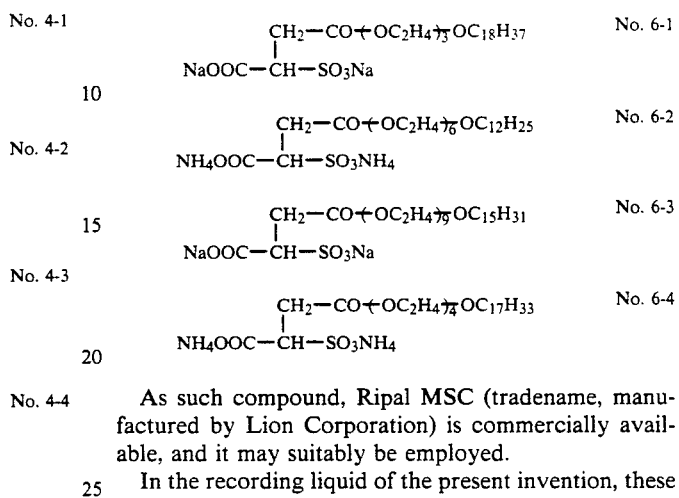

No. 6-1

No. 6-2

No. 6-3

No. 6-4

As such compound, Ripal MSC (tradename, manufactured by Lion Corporation) is commercially available, and it may suitably be employed.

In the recording liquid of the present invention, these dispersants are contained alone or as a mixture in an amount within a range of from 20 to 90% by weight, preferably from 30 to 60% by weight, relative to the weight of the pigment.

In the recording liquid of the present invention, the pigment may be of azo type, phthalocyanine type or quinacridone-type, or carbon black. Particularly preferred are Pigment Yellow-74 and -154, Pigment Red-5 and -122 and Pigment Blue-15.

For the recording liquid of the present invention, the type of the dispersant is preferably selected depending upon the type of the pigment. For example, when an azo type pigment is employed as the pigment, it is preferred to use, as the dispersant, at least one member selected from the group consisting of compounds of the formulas (I) to (VI). It is particularly preferred to employ at least one member selected from the group consisting of compounds of the formulas (I) and (II), at least one member selected from the group consisting of compounds of the formula (III), or at least one member selected from the group consisting of compounds of the formula (IV).

When the pigment is a quinacridone-type pigment, it is preferred to use, as the dispersant, at least one member selected from the group consisting of compounds of the formulas (I) to (VI). It is particularly preferred to use at least one member selected from the group consisting of compounds of the formulas (I) and (II), or at least one member selected from the group consisting of compounds of the formula (IV).

When the pigment is a phthalocyanine-type pigment, it is preferred to use, as the dispersant, at least one member selected from the group consisting of compounds of the formulas (I) to (III) and (VII).

When the pigment is carbon black, it is preferred to use, as the dispersant, at least one member selected from the group consisting of compounds of the formulas (I) to (VI). It is particularly preferred to use at least one member selected from the group consisting of compounds of the formulas (I) and (II).

The dispersants of the formulas (I) and (II) may suitably be used for any types of pigments.

The content of the pigment is usually within a range of from 0.5 to 10% by weight, preferably from 1 to 7% by weight, based on the total weight of the recording liquid.

The aqueous medium to be used for the recording liquid of the present invention, comprises water and a water-soluble organic solvent such as ethylene glycol, propylene glycol, butylene glycol, diethylene glycol, triethylene glycol, polyethylene glycol (#200), polyethylene glycol (#400), glycerol, N-methyl-pyrrolidone, N-ethyl-pyrrolidone, N-vinyl pyrrolidone, 1,3-dimethyl-imidazolidine, ethylene glycol monoallyl ether, ethylene glycol monomethyl ether or diethylene glycol monomethyl ether. Among them, particularly preferred as the water-soluble organic solvent is glycerol, ethylene glycol or diethylene glycol. The water-soluble organic solvent is used usually in an amount of from 0 to 50% by weight, based on the total weight of the recording liquid.

Further, it is possible to improve the drying property after printing and the printing quality by incorporating from 0.5 to 20% by weight of a surfactant to the recording liquid of the present invention.

It is also possible to further improve the jetting stability by incorporating urea or caprolactam to the recording liquid of the present invention.

Now, the present invention will be described in further detail with reference to examples. However, it should be understood that the present invention is by no means restricted to such specific examples.

EXAMPLE 1

| Composition of recording liquid | Amount (g) |
| --- | --- |
| Polyethylene glycol (#200) | 15 |
| Compound No. 1-1 | 1.5 |
| Pigment Red 122 | 4 |
| Water | Rest |
| Total | 100 |

The above identified components were put into a container and subjected to pulverization treatment for 20 hours together with 130 ml of glass beads having an average diameter of 0.5 mm by means of a sand grinder (manufactured by Igarashi Kikai Seizo K.K.). The mixture was press-filtered through a teflon filter with a pore 2 diameter of 3 μm and then subjected to deaeration treatment by means of a vacuum pump and a supersonic washing machine to obtain a recording liquid.

Using the obtained recording liquid, ink jet recording was conducted on electrophotographic paper (manufactured by Fuji Xerox Co., Ltd.) by means of an ink jet printer (IO-735, manufactured by Sharp Corporation), whereby evaluation of various properties was conducted in accordance with the following methods (a), (b) and (c).

(a) Light resistance of the recorded image

The printed matter was irradiated for 100 hours by means of a xenon fade meter (manufactured by Suga Shikenki K.K.), whereupon discoloration was minimum.

(b) Storage stability

The recording liquid was sealed in a teflon container and stored at 60° C. for 2 months, whereupon no gelatin or precipitation was observed.

(c) Jetting stability

Jetting was conducted continuously at room temperature for 48 hours. During the continuous operation, high quality printing was carried out under a stabilized condition.

EXAMPLE 2

Preparation of recording liquids and evaluation of various properties were conducted in the same manner as in Example 1 except that in Example 1, instead of compound No. 1-1, compound No. 2-5, No. 3-1, No. 4-1, No. 5-1 and No. 6-1 were used, respectively, whereby good results were obtained.

COMPARATIVE EXAMPLE 1

A recording liquid was prepared by using Discol 30 (manufactured by Daiichi Kogyo Seiyaku K.K.) i.e. a type dispersant instead of compound No. 1-1 in Example 1, and evaluation was conducted in the same manner as in Example 1, whereby precipitate formed at 60° C. in three days, and in the continuous jetting at room temperature, jetting became impossible in 15 hours.

COMPARATIVE EXAMPLE 2

A recording liquid was prepared by using Pronon 204 (manufactured by Nippon Oil and Fats Co., Ltd.) i.e. an oxyethylene-oxypropylene block polymer type dispersant instead of compound No. 1-1 in Example 1, and evaluation was conducted in the same manner as in Example 1, whereby precipitate formed at 60° C. in 7 days, and in the continuous jetting at room temperature, jetting became impossible in 20 hours.

EXAMPLE 3

| Composition of recording liquid | Amount (g) |
| --- | --- |
| Diethylene glycol | 20 |
| Compound No. 1-2 | 1 |
| Pigment Blue 15 | 3 |
| Water | Rest |
| Total | 100 |

With the above composition, a recording liquid was prepared in the same manner as in Example 1, and various properties were evaluated in accordance with the methods (a), (b) and (c), whereby good results were obtained with respect to the respective properties.

EXAMPLE 4

Preparation of a recording liquid was conducted in the same manner as in Example 1 using the same composition as in Example 3 except that instead of compound No. 1-2, compound No. 2-10, No. 3-3, No. 4-2, No. 5-3 or No. 6-3 was used, and evaluation of the various properties was conducted in the same manner as in Example 1, whereby good results were obtained in each case.

COMPARATIVE EXAMPLE 3

A recording liquid was prepared in the same manner as in Example 1 by using the same composition as in Example 3 except that instead of compound No. 1-2, Polynus PS-1 (manufactured by Tosoh Corporation) i.e. a polystyrene-sodium sulfonate-type dispersant, was used, and evaluation of various properties was conducted in the same manner as in Example 1, whereby precipitate formed at 60° C. in 4 days, and in the continuous jetting at room temperature, jetting became impossible in 13 hours.

EXAMPLE 5

| Composition of recording liquid | Amount (g) |
| --- | --- |
| Compound No. 1-4 | 0.5 |
| Compound No. 1-6 | 0.5 |
| Pigment Yellow-74 | 2 |
| Water | Rest |
| Total | 100 |

With the above composition, a recording liquid was prepared in the same manner as in Example 1, and evaluation of various properties were conducted in the same manner as in Example 1, whereby good results were obtained as in Example 1.

EXAMPLE 6

A recording liquid was prepared in the same manner as in Example 1 by using the same composition as in Example 5 except that instead of compounds No. 1-4 and No. 1-6, compounds No. 3-2 and No. 3-4 were used, and evaluation of various properties was conducted in the same manner as in Example 1, whereby good results were obtained.

EXAMPLE 7

| Composition of recording liquid | Amount (g) |
| --- | --- |
| Compound No. 1-1 | 0.5 |
| Compound No. 1-3 | 1.0 |
| Compound No. 1-7 | 1.5 |
| Carbon black | 6 |
| ε-caprolactam | 5 |
| Water | Rest |
| Total | 100 |

With the above composition, a recording liquid was prepared in the same manner as in Example 1, and evaluation of various properties were conducted in the same manner as in Example 1, whereby good results were obtained as in Example 1.

EXAMPLES 8 to 11

A recording liquid was prepared in the same manner as in Example 1 by using the same composition as in Example 7 except that the dispersants were changed as identified in the following Table instead of compounds No. 1-1, No. 1-3 and No. 1-7, and evaluation of various properties was conducted in the same manner as in Example 1, whereby good results were obtained in each case.

| Example No. | Dispersants | Amount (g) |
| --- | --- | --- |
| 8 | Compound No. 3-1 | 0.5 |
|   | Compound No. 3-3 | 1.0 |
|   | Compound No. 3-4 | 1.5 |
| 9 | Compound No. 4-1 | 1.5 |
|   | Compound No. 4-4 | 1.5 |
| 10 | Compound No. 5-1 | 0.5 |
|   | Compound No. 5-2 | 1.0 |
|   | Compound No. 5-4 | 1.5 |
| 11 | Compound No. 6-1 | 0.5 |
|   | Compound No. 6-2 | 1.0 |
|   | Compound No. 6-4 | 1.5 |

EXAMPLE 12

| Composition of recording liquid | Amount (g) |
| --- | --- |
| Glycerol | 15 |
| Compound No. 2-1 | 1.0 |
| Pigment Yellow-74 | 2 |
| Water | Rest |
| Total | 100 |

With the above composition, a recording liquid was prepared in the same manner as in Example 1, and evaluation of various properties were conducted in the same manner as in Example 1, whereby good results were obtained as in Example 1.

COMPARATIVE EXAMPLE 4

A recording liquid was prepared in the same manner as in Example 1 by using the same composition as in Example 12 except that instead of compound No. 2-1 in Example 12, Discol 30 (manufactured by Daiichi Kogyo Seiyaku K.K.) i.e. a naphthalene sulfonic acid-formalin condensation product-type dispersant was used, and evaluation of various properties was conducted in the same manner as in Example 1, whereby precipitate formed at 60° C. in 3 days, and in the continuous jetting at room temperature, jetting became impossible in 15 hours.

COMPARATIVE EXAMPLE 5

A recording liquid was prepared in the same manner as in Example 1 by using the same composition as in Example 12 except that instead of compound No. 2-1 in Example 12, Pronon 204 (Nippon Oil and Fats Co., Ltd.) i.e. an oxyethylene-oxypropylene block polymer type dispersant was used, and evaluation of various properties was conducted in the same manner as in Example 1, whereby precipitate formed at 60° C. in 7 days, and in the continuous jetting at room temperature, jetting became impossible in 20 hours.

EXAMPLE 13

| Composition of recording liquid | Amount (g) |
| --- | --- |
| Compound No. 2-6 | 0.5 |
| Compound No. 2-8 | 0.5 |
| Glycerol | 10 |
| Pigment Yellow-74 | 2 |
| Water | Rest |
| Total | 100 |

With the above composition, a recording liquid was prepared in the same manner as in Example 1, and evaluation of various properties was conducted in the same manner as in Example 1, whereby good results were obtained.

EXAMPLE 14

A recording liquid was prepared in the same manner as in Example 1 using the same composition as in Example 13 except that instead of compounds No. 2-6 and No. 2-8, the following compounds were used as the dispersants, and evaluation of various properties was conducted in the same manner as in Example 1, whereby good results were obtained in each case.

| Example No. | Dispersants | Amount (g) |
| --- | --- | --- |
| 14 | Compound No. 4-2 | 1.0 |
| 15 | Compound No. 5-1 | 0.5 |
|  | Compound No. 5-4 | 0.5 |
| 16 | Compound No. 6-1 | 0.5 |
|  | Compound No. 6-4 | 0.5 |

EXAMPLE 7

| Composition of recording liquid | Amount (g) |
| --- | --- |
| Compound No. 2-2 | 1.0 |
| Compound No. 2-4 | 1.0 |
| Polyethylene glycol (#200) | 15 |
| Pigment Red 5 | 4 |
| Water | Rest |
| Total | 100 |

With the above composition, a recording liquid was prepared in the same manner as in Example 1, and evaluation of various properties was conducted in the same manner as in Example 1, whereby good results were obtained.

EXAMPLE 18

With Composition A or Composition B as identified below, a recording liquid was prepared in the same manner as in Example 1 by using various dispersants and pigments as identified in the following Table, and the storage stability of the recording liquid was examined at 60° C. for 3 months. Comparative results are shown in the Table.

| Composition of recording liquid | Amount (g) |
| --- | --- |
| Composition A: |  |
| Pigment | x |
| Dispersant | $x \times \frac{1}{3}$ |
| Glycerol | 15 |
| Water | Rest |
| Total | 100 |
| Composition B: |  |
| Pigment | x |
| Dispersant | $x \times \frac{2}{3}$ |
| Glycerol | 15 |
| Water | Rest |
| Total | 100 |

Amount x is 3 g when the pigment is Pigment Yellow-74 or carbon black, 2.5 g when the pigment is Pigment Blue-15, and 4 g when the pigment is Pigment Red-122.

| | | | | |
| --- | --- | --- | --- | --- |
| Evaluation of storage stability of recording liquid (Temp: 60° C., Period: 3 months) | | | | |
| | Pigment | | | |
| Dispersant (structural formula of main component) | Pigment Yellow-74 (Azo-type) | Pigment Red-122 (Quinacridone-type) | Pigment Blue-15 (phthalocyanine-type) | Carbon black #45 |
| Riporan PB-800<br>$R-CH_2-CH(OH)-(CH_2)_n-SO_3M$<br>n = 1, R C$_{14-18}$ | A: ○<br>B: ○ | A: ⊙<br>B: ⊙ | A: ○<br>B: ○ | A: ⊙<br>B: △ |
| Ripal NTD<br>$NaO_3S-CH(CH_2-CONH-C_{18}H_{37})-COONa$ | A: △<br>B: ○ | A: ○<br>B: ⊙ | A: ⊙<br>B: X | A: ○<br>B: ○ |
| Ripal NCD<br>$NaO_3S-CH(CH_2CONH-C_{12}H_{25})-COONa$ | A: ○<br>B: △ | A: ⊙<br>B: ⊙ | A: ○<br>B: ⊙ | A: ○<br>B: △ |
| Diapon LM<br>$C_{12}H_{25}-CON(CH_3)(C_2H_4SO_3Na)$ | A: ○<br>B: ○ | A: △<br>B: Not tested | A: ○<br>B: ⊙ | A: X<br>B: X |
| Diapon T<br>$R-CON(CH_3)(C_2H_4SO_3Na)$<br>(R = $C_{17}H_{35}$: R = $C_{17}H_{33}$ = 1:1) | A: ○<br>B: ○ | Not tested | A: ⊙<br>B: Not tested | A: ○<br>B: Not tested |
| Diaserver SC-T<br>$C_{17}H_{33}-CON(CH_3)(C_2H_4SO_3Na)$ | A: X<br>B: △ | A: X<br>B: X | A: ⊙<br>B: ⊙ | A: Not tested<br>B: X |

-continued

Evaluation of storage stability of recording liquid
(Temp: 60° C., Period: 3 months)

| Dispersant (structural formula of main component) | Pigment Yellow-74 (Azo-type) | Pigment Red-122 (Quinacri- done-type) | Pigment Blue-15 (phthalo- cyanine-type) | Carbon black #45 |
|---|---|---|---|---|
| Rapizol B-80 $CH_2COOC_8H_{17}$<br>\|<br>$NaO_3S—CHCOOC_8H_{17}$ | A: ○<br>B: ○ | A: X<br>B: Not tested | A: ⊙<br>B: ⊙ | A: Not tested<br>B: X |

⊙: Excellent, ○: Good, △: Fair, X: Poor

What is claimed is:

1. A recording liquid for ink jet recording, which comprises an aqueous medium, a pigment and, as a dispersant, at least one member selected from the group consisting of compounds of the following formula (I) to (X):

$$R^1—CH_2CH(—CH_2)_{\overline{m}}SO_3M \quad (I)$$
$$\quad\quad\quad |$$
$$\quad\quad\quad OH$$

wherein $R^1$ is a $C_{8-20}$ alkyl group, m is an integer of from 1 to 3, and M is Na or $NH_4$, $$R^2—CH=CH(—CH_2)_{\overline{n}}SO_3M \quad (II)$$

wherein $R^2$ is a $C_{8-20}$ alkyl group, n is an integer of from 1 to 3, and M is Na or $NH_4$, $$CH_2—COOR^3 \quad\quad (III)$$
$$|$$
$$MO_3S—CH—COOR^4$$

wherein each of $R^3$ and $R^4$ is a $C_{6-16}$ alkyl or alkenyl group, and M is Na or $NH_4$, $$CH_2—CONHR^5 \quad\quad (IV)$$
$$|$$
$$MO_3S—CH—COOM$$

wherein $R^5$ is a $C_{10-20}$ alkyl or alkenyl group, and M is Na or $NH_4$, $$CH_2—CONHR^6 \quad\quad (V)$$
$$|$$
$$MO_3S—CH—CONHR^6$$

wherein $R^6$ is a $C_{6-16}$ alkyl or alkenyl group, and M is Na or $NH_4$, $$CH_2—COOR^7 \quad\quad (VI)$$
$$|$$
$$MO_3S—CH—COOM$$

wherein $R^7$ is a $C_{10-20}$ alkyl or alkenyl group, and M is Na or $NH_4$, $$\quad\quad\quad R^9 \quad\quad (VII)$$
$$\quad\quad / $$
$$R^8—CON$$
$$\quad\quad \backslash$$
$$\quad\quad R^{10}—SO_3M$$

wherein $R^8$ is a $C_{10-20}$ alkyl or alkenyl group, $R^9$ is a $C_{1-4}$ alkyl group and $R^{10}$ is a $C_{1-3}$ alkylene group, and M is Na or $NH_4$,

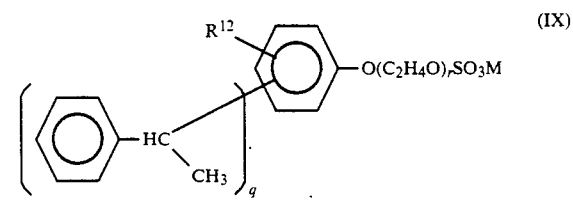

(VIII)

wherein $R^{11}$ is a $C_{6-18}$ alkyl group, p is an integer of from 1 to 15, and M is Na or $NH_4$,

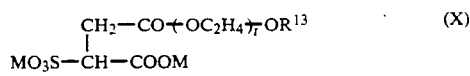

(IX)

wherein $R^{12}$ is a methyl group or a hydrogen atom, q is an integer of 1 or 2, r is an integer of from 1 to 8, and M is Na or $NH_4$, and $$CH_2—CO(—OC_2H_4)_{\overline{t}}OR^{13} \quad\quad (X)$$
$$|$$
$$MO_3S—CH—COOM$$

wherein t is an integer of from 1 to 10, $R^{13}$ is a $C_{10-20}$ alkyl or alkenyl group, and M is Na or $NH_4$.

2. The recording liquid according to claim 1, which comprises an aqueous medium, a pigment and, as a dispersant, at least one member selected from the group consisting of compounds of the following formulas (I) and (II);

$$R^1—CH_2CH(—CH_2)_{\overline{m}}SO_3M \quad (I)$$
$$\quad\quad\quad |$$
$$\quad\quad\quad OH$$

wherein $R^1$ is a $C_{8-20}$ alkyl group, m is an integer of from 1 to 3, and M is Na or $NH_4$, and $$R^2—CH=CH(—CH_2)_{\overline{n}}SO_3M \quad (II)$$

wherein $R^2$ is a $C_{8-20}$ alkyl group, n is an interfere of from 1 to 3, and M is Na or $NH_4$.

3. The recording liquid according to claim 1, which comprises an aqueous medium, a pigment and, as a dispersant, at least one member selected from the group consisting of the compounds of the formulas (III) to (VI);

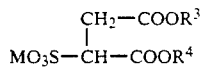  (III)

wherein each of $R^3$ and $R^4$ is a $C_{6-16}$ alkyl or alkenyl group, and M is Na or $NH_4$,

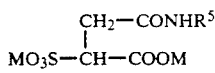  (IV)

wherein $R^5$ is a $C_{10-20}$ alkyl or alkenyl group, and M is Na or $NH_4$,

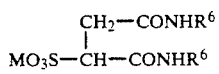  (V)

wherein $R^6$ is a $C_{6-16}$ alkyl or alkenyl group, and M is Na or $NH_4$, and

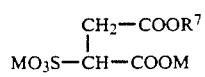  (VI)

wherein $R^7$ is a $C_{10-20}$ alkyl or alkenyl group, and M is Na or $NH_4$.

4. The recording liquid according to claim 1, which comprises an aqueous medium, a pigment and, as a dispersant, at least one member selected from the group consisting of compounds of the following formula (VII):

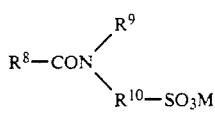  (VII)

wherein $R^8$ is a $C_{10-20}$ alkyl or alkenyl group, $R^9$ is a $C_{1-4}$ alkyl group and $R^{10}$ is a $C_{1-3}$ alkylene group, and M is Na or $NH_4$.

5. The recording liquid according to claim 1, which comprises an aqueous medium, a pigment and, as a dispersant, at least one member selected from the group consisting of compounds of the following formula (VIII):

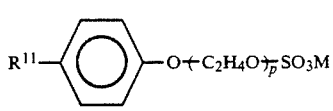  (VIII)

wherein $R^{11}$ is a $C_{6-18}$ alkyl group, p is an integer of from 1 to 15, and M is Na or $NH_4$.

6. The recording liquid according to claim 1, which comprises an aqueous medium, a pigment and, as a dispersant, at least one member selected from the group consisting of compounds of the following formula (IX):

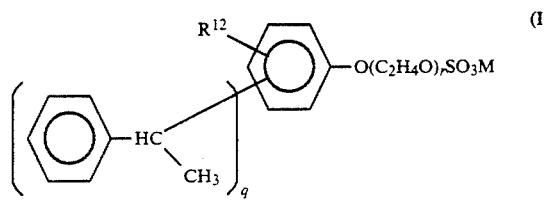  (IX)

wherein $R^{12}$ is a methyl group or a hydrogen atom, q is 1 or 2, r is an integer of from 1 to 8, and M is Na or $NH_4$.

7. The recording liquid according to claim 1, which comprises an aqueous medium, a pigment and, as a dispersant, at least one member selected from the group consisting of compounds of the following formula (X):

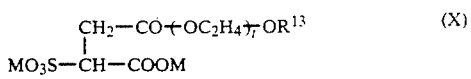  (X)

wherein t is an integer of from 1 to 10, $R^{13}$ is a $C_{10-20}$ alkyl or alkenyl group, and M is Na or $NH_4$.

8. The recording liquid according to claim 1, wherein the aqueous medium is a solvent mixture comprising water and an aqueous organic solvent selected from the group consisting of ethylene glycol, propylene glycol, butylene glycol, diethylene glycol, triethylene glycol, polyethylene glycol (#200), polyethylene glycol (#400), glycerol, N-methyl-pyrrolidone, N-ethyl-pyrrolidone, N-vinyl-pyrrolidone, 1,3-dimethyl-imidazolidine, ethylene glycol monoallyl ether, ethylene glycol monomethyl ether and diethylene glycol monomethyl ether.

9. The recording liquid according to claim 1, wherein the pigment is an azo-pigment, and at least one member selected from the group consisting of compounds of the formulas (I) to (VI) is contained as the dispersant.

10. The recording liquid according to claim 9, wherein at least one member selected from the group consisting of compounds of the formulas (I) and (II), at least one member selected from the group consisting of compounds of the formula (III), or at least one member selected from the group consisting of compounds of the formula (IV), is employed as the dispersant.

11. The recording liquid according to claim 1, wherein the pigment is a quinacridone pigment, and at least one member selected from the group consisting of compounds of the formulas (I) to (VI) is contained as the dispersant.

12. The recording liquid according to claim 11, wherein the dispersant is at least one member selected from the group consisting of compounds of the formulas (I) and (II), or at least one member selected from the group consisting of compounds of the formula (IV).

13. The recording liquid according to claim 1, wherein the pigment is phthalocyanine pigment, and at least one member selected from the group consisting of compounds of the formulas (I) to (III) and (VII), is contained as the dispersant.

14. The recording liquid according to claim 1, wherein the pigment is carbon black and at least one member selected from the group consisting of compounds of the formulas (I) to (VI) is contained as the dispersant.

15. The recording liquid according to claim 14, wherein the dispersant is at least one member selected from the group consisting of compounds of the formulas (I) and (II).

16. The recording liquid according to claim 1, wherein at least one member selected from the group consisting of compounds of the formulas (I) and (II) is used as the dispersant.

17. The recording liquid according to claim 1, wherein the pigment is contained in an amount of from 0.5 to 10% by weight based on the total amount by weight of the recording liquid.

18. The recording liquid according to claim 1, wherein the dispersant is used in an amount of from 20 to 90% by weight based on the weight of the pigment.

* * * * *